United States Patent

[11] 3,607,163

| | | |
|---|---|---|
| [72] | Inventors | Howard Cameron Smith;<br>William Bell Allan, both of Glasgow, Scotland |
| [21] | Appl. No. | 740,428 |
| [22] | Filed | June 12, 1968 |
| [45] | Patented | Sept. 21, 1971 |
| [73] | Assignee | Barr and Stroud Limited<br>Anniesland, Glasgow, Scotland |
| [32] | Priority | July 14, 1967 |
| [33] | | Great Britain |
| [31] | | 32411/67 |

[54] METHOD FOR MAKING GLASS TUBES
4 Claims, 1 Drawing Fig.

[52] U.S. Cl. .................................................... 65/1,
65/13, 65/71, 65/279, 65/297, 264/311
[51] Int. Cl. ........................................................C03b 19/04,
C03b 37/02
[50] Field of Search........................................... 264/270,
310, 311; 65/1, 13, 71, 266, 278, 279, 280, 297, 298, 299

[56] References Cited
UNITED STATES PATENTS

| | | | |
|---|---|---|---|
| 2,714,227 | 8/1955 | Graham et al. ............... | 264/311 X |
| 2,826,869 | 3/1958 | Lerch........................... | 65/71 |
| 2,980,957 | 4/1961 | Hicks ........................... | 65/13 |
| 3,428,475 | 2/1969 | Teeg............................. | 65/60 X |
| 3,455,666 | 7/1969 | Bazinet......................... | 65/13 X |

*Primary Examiner*—S. Leon Bashore
*Assistant Examiner*—Robert Lindsay, Jr.
*Attorney*—Mason, Fenwick & Lawrence

ABSTRACT: This invention relates to a method of producing a tube from a glass that gives off undesirable vapors when heated in which glass cullet is placed into a horizontally disposed forming tube that is made of a material which is not wetted by the glass and has a lower coefficient of expansion (for instance the forming tube may be made of a borosilicate glass). The cullet is heated to melt the cullet while the forming tube rotates so that it coats the tube. The forming tube is cooled until the glass from the cullet has solidified as a tube. This tube may be used for making fibers in which a rod is subsequently inserted into this tube.

PATENTED SEP 21 1971
3,607,163
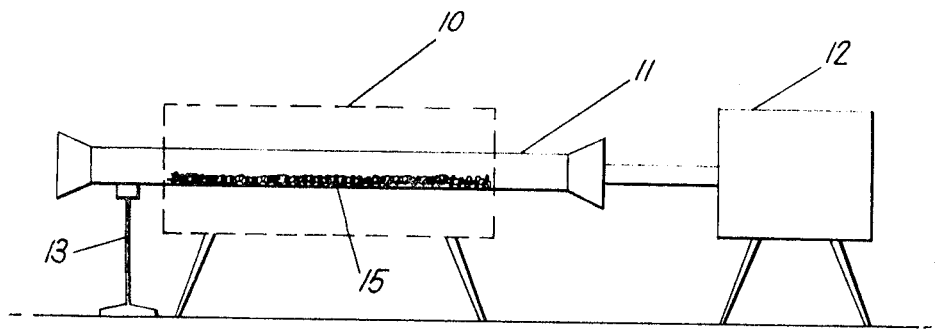
Inventors
HOWARD CAMERON SMITH &
WILLIAM BELL ALLAN
By
Mason, Fenwick & Lawrence
Attorneys

METHOD FOR MAKING GLASS TUBES

This invention is concerned with improvements in and relating to making arsenic trisulfide, arsenic triselenide etc. glass fibers.

Arsenic trisulfide glass fibers are useful in infrared optics, yet their manufacture has proved to be difficult and sometimes dangerous.

A method proposed heretofore for manufacturing these fibers has involved the use of concentric crucibles in a sealed furnace provided with a nitrogen atmosphere. Difficulties however have been encountered in maintaining the crucible concentric and in adjusting the relative flows of molten glasses from the crucibles, these considerations seriously affecting the fiber quality. Moreover, it has been found that, despite the precautions, arsenious vapors were given off.

It is an object of the present invention to obviate or mitigate the aforementioned difficulties.

The present invention provides a method of producing a glass tube, including the steps of placing cullet of the glass in a horizontal forming tube of a material having a much smaller coefficient of expansion and which is not "wetted" by the glass, melting the cullet, rotating the tube to coat its inner surface and cooling the combination slowly to contract a glass tube off the wall of the forming tube.

The material may be a borosilicate glass.

The cullet may be arsenic trisulfide glass.

The present invention also provides a method of forming an arsenic trisulfide glass fiber, comprising forming modified arsenic trisulfide sheath of lower refractive index by the method defined in the third last-preceding paragraph, inserting a polished arsenic trisulfide rod into the sheath, locating the combination in a vertical furnace and drawing therefrom a fiber.

The present invention also provides apparatus for producing a glass tube comprising a horizontal furnace, drive means located at one end of the furnace, support means located at the other end of the furnace, and a forming tube supported horizontally by the drive means and the support means and adapted to be rotated by the drive means.

An embodiment of the present invention will now be described, by way of example, with reference to the accompanying drawing, the single FIGURE of which diagrammatically illustrates apparatus for forming arsenic trisulfide glass tubes.

Referring now to the drawing, apparatus for forming arsenic trisulfide ($As_2S_3$) glass tubes consists of a cylindrical evenly heated furnace 10 in which is supported a forming tube 11 of a borosilicate glass such as "Pyrex" (Pyrex is a registered trademark). At one end the tube 11 is coupled to and supported by a electric motor 12 and at the other end the tube 11 is rotatably supported on a vertically adjustable support 13. The ends of the tube 11 are sealed.

In use, cullet 15 of arsenic trisulfide glass modified by 5–10 percent sulfur parts by weight is distributed as evenly as possible along the tube 11 within the furnace 10. The support 13 is adjusted if necessary to make the tube 11 horizontal. The furnace 10 then raises the temperature of the glass to 500° C. and then the electric motor is switched on to rotate the tube 11 at about 70 r.p.m. The molten arsenic trisulfide glass coats the inner surface of the tube 11.

The furnace is held at 500° C. for 2 or 3 minutes and then the temperature is reduced.

The spinning process is continued until the glass reaches the annealing temperature, where a "rough" annealing of the arsenic trisulfide tube takes place. A slow cooling rate follows and due to the different coefficients of expansion, that of the borosilicate glass being much smaller than that of the arsenic trisulfide glass, the arsenic trisulfide glass contracts, as a tube, off the wall of the borosilicate tube as the glasses cool. The contraction begins at the outer ends of the tube and works inwards towards the center. When the contractions meet, the arsenic trisulfide tube cracks in the middle producing two shorter tubes.

The wall thickness of the arsenic trisulfide tubes if normally constant across the diameter of the tube, but increases at the ends, i.e. the parts of the tube that had been in the cooler parts of the furnace. This thickening is not normally objectionable.

It should be noted that as the ends of the containing borosilicate tube are sealed, arsenious vapors cannot escape during preparation of the arsenic trisulfide tube.

The arsenic trisulfide tube having been made a fiber, can now be made in the normal manner. The tube is secured into a holder, a polished rod of pure arsenic trisulfide glass is inserted in the tube and the fiber is pulled in a conventional vertical furnace.

The invention may obviously be applied to the preparation of glass tubes in general. The embodiment may be modified by substituting for the borosilicate glass tube, a forming tube of any suitable material, i.e. that does not wet with the glass tube being formed and that has a coefficient of expansion much smaller than that of the glass to allow the glass tube to separate off the forming tube.

I claim:

1. A method of producing a tube of uncontaminated glass cullet, which glass gives off undesirable vapors when melted, including the steps of
    providing a horizontally disposed forming tube of a material which is not wettable by the glass and which has a much smaller coefficient of expansion than the glass,
    placing the entire cullet of said glass in uncontaminated form in said forming tube,
    heating the cullet so as to melt the glass and subsequently rotating the forming tube so as to coat its inner surface with melted glass,
    and slowly cooling the rotating forming tube in order to contract a solidified glass tube from the wall of the forming tube due to the difference in coefficients of expansion.

2. The method according to claim 1, wherein the forming tube is made of borosilicate glass and the cullet is of a glass selected from the group consisting of arsenic triselenide and arsenic trisulfide glass.

3. A method of forming an arsenic trisulfide glass fiber comprising the steps of forming a tube of arsenic trisulfide glass by the method according to claim 2, inserting a polished rod of arsenic trisulfide into said glass tube, locating the rod and tube in a vertical furnace and drawing a fiber therefrom in a manner known per se.

4. The method according to claim 2, including the step of sealing said forming tube prior to melting said cullet.